(12) United States Patent
Dirks et al.

(10) Patent No.: US 11,460,063 B2
(45) Date of Patent: Oct. 4, 2022

(54) METHOD FOR ADHESIVELY BONDING TWO COMPONENTS ARRANGED POSITIONALLY ACCURATELY IN RELATION TO ONE ANOTHER

(71) Applicant: HELLA GmbH & Co. KGaA, Lippstadt (DE)

(72) Inventors: Heinz-Michael Dirks, Lippstadt (DE); Miguel Lebrato-Rastrojo, Paderborn (DE); Thomas Albert Roebbecke, Erwitte (DE); Simone Rohrberg, Lippstadt (DE); Christian Wieck, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/322,386

(22) Filed: May 17, 2021

(65) Prior Publication Data
US 2021/0270302 A1 Sep. 2, 2021

Related U.S. Application Data

(63) Continuation of application No. PCT/EP2019/080019, filed on Nov. 4, 2019.

(30) Foreign Application Priority Data

Nov. 16, 2018 (DE) ..................... 10 2018 128 863.8

(51) Int. Cl.
*F16B 11/00* (2006.01)
*B29C 65/48* (2006.01)
(Continued)

(52) U.S. Cl.
CPC ........ *F16B 11/006* (2013.01); *B29C 65/4845* (2013.01); *C09J 5/02* (2013.01); *F21V 19/005* (2013.01); *C09J 2301/416* (2020.08)

(58) Field of Classification Search
CPC ....... F16B 11/006; B29C 65/4845; C09J 5/02; C09J 2301/416; F21V 19/005
See application file for complete search history.

(56) References Cited

U.S. PATENT DOCUMENTS

| | | | |
|---|---|---|---|
| 4,740,947 A | 4/1988 | Ohta et al. | |
| 5,578,156 A * | 11/1996 | Kamakura | H01L 33/58 |
| | | | 156/275.5 |

(Continued)

FOREIGN PATENT DOCUMENTS

| | | |
|---|---|---|
| DE | 102006043185 A1 | 4/2008 |
| DE | 102009031188 A1 | 12/2010 |

(Continued)

OTHER PUBLICATIONS

Machine Translation of EP-1690906-A1 (Year: 2006).*
International Search Report dated Feb. 5, 2020 in corresponding application PCT/EP2019/080019.

*Primary Examiner* — Daniel McNally
(74) *Attorney, Agent, or Firm* — Muncy, Geissler, Olds & Lowe, P.C.

(57) ABSTRACT

A method for adhesively bonding components, in particular a lamp holder on a mounting, wherein the method includes at least the following steps: producing a load-bearing adhesive bond by means of introducing a slowly curing adhesive into or onto an adhesive receptacle between the components; arranging at least one light-transparent fixing element in physical contact with at least one of the components; adhesively bonding the fixing element to at least one of the components by means of introducing a fixing adhesive at fixing bonding points; transmitting light from a light source through the fixing element to cure the fixing adhesive at the fixing bonding points; and long-time curing of the slowly curing adhesive of the load-bearing adhesive bond.

10 Claims, 3 Drawing Sheets

(51) Int. Cl.
*C09J 5/02* (2006.01)
*F21V 19/00* (2006.01)

(56) References Cited

U.S. PATENT DOCUMENTS

| | | | | |
|---|---|---|---|---|
| 6,238,508 B1 * | 5/2001 | Hauer | ........................ | C09J 5/06 |
| | | | | 156/273.3 |
| 8,663,417 B2 | 3/2014 | Braun | | |
| 2012/0090777 A1 * | 4/2012 | Braun | .................. | F16B 11/006 |
| | | | | 156/275.5 |
| 2018/0238509 A1 * | 8/2018 | Simone | .................. | F21S 43/37 |

FOREIGN PATENT DOCUMENTS

| | | | | |
|---|---|---|---|---|
| DE | 102012221174 A1 | 5/2014 | | |
| EP | 1690906 A1 * | 8/2006 | ................ | C09J 5/02 |
| EP | 1690906 B1 | 4/2010 | | |

* cited by examiner

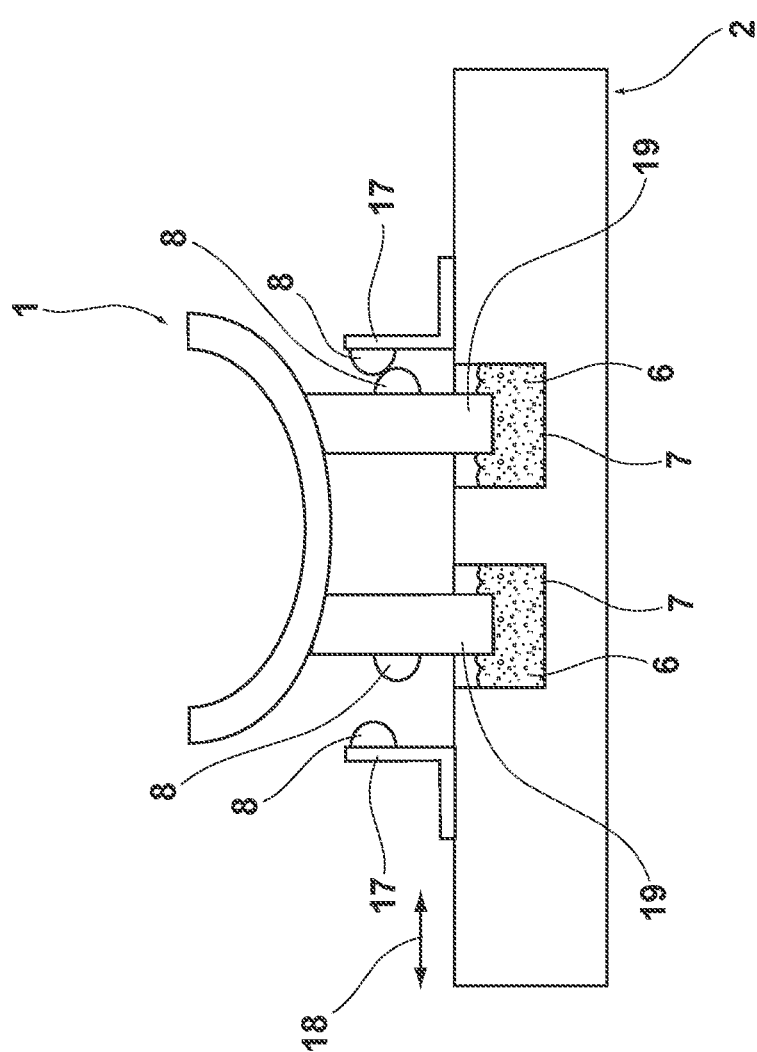

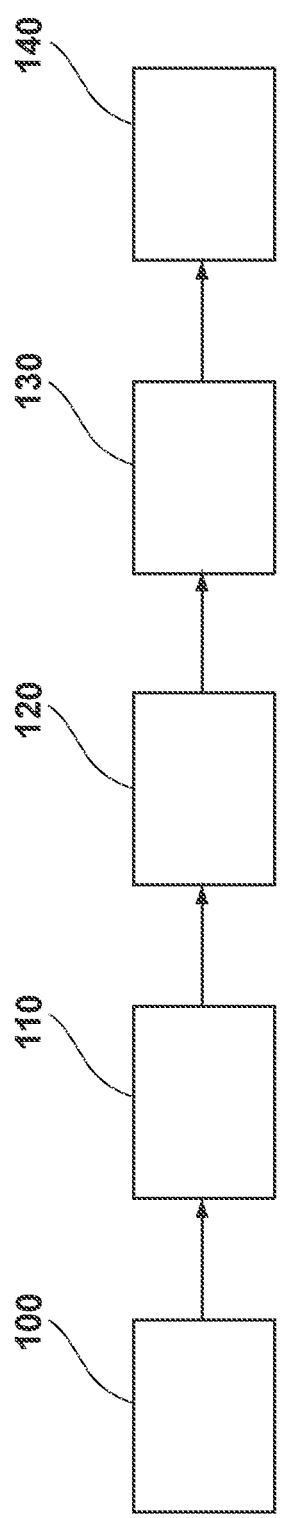

METHOD FOR ADHESIVELY BONDING TWO COMPONENTS ARRANGED POSITIONALLY ACCURATELY IN RELATION TO ONE ANOTHER

This nonprovisional application is a continuation of International Application No. PCT/EP2019/080019, which was filed on Nov. 4, 2019 and which claims priority to German Patent Application No. 10 2018 128 863.8, which was filed in Germany on Nov. 16, 2018 and which are both herein incorporated by reference.

BACKGROUND OF THE INVENTION

Field of the Invention

The present invention relates to a method for adhesively bonding components, in particular a lamp holder on a mounting.

Description of the Background Art

Lamp holders are used to receive illuminants which must be aligned positionally accurately relative to an optical component, for example, a lens or a reflector. In this regard, the lens or the reflector is often initially arranged stationary relative to the mounting, and the position of the lamp holder with the illuminant must be changed until the desired lighting result is achieved, especially in the assembly of light modules for headlights. The illuminants in arrangement at or on the lamp holder can be put into use for this purpose, and the lighting result produced is measured while a manipulator moves the components relative to one another.

As soon as the desired position of the illuminant relative to the lens or, for example, to the reflector is reached, the attained position of the lamp holder relative to the mounting must be maintained. If usual adhesive bonds are used, a deviation of the lamp holder in the adjusted position relative to the mounting can thus occur due to the shrinkage process when the adhesive cures, as a result of which the subsequent lighting result worsens for the use of the light module, especially after the adhesive has cured.

Particularly when cylindrical pins are used which protrude into receiving cavities with adhesives received therein, cylindrical pins already arranged off-center can produce a different shrinkage extent, because the amount of adhesive surrounding the cylindrical pins is unevenly distributed over the circumference. However, if the lamp holder is adjusted relative to the mounting, for example, it is often unavoidable that the cylindrical pins in the end remain off-center in the receiving cavity in order to finally allow the adhesive to dry and thus cure.

To overcome misalignments of two components to one another caused by the drying of the adhesive bonds, adhesive fixing bonds are known which, however, initially serve to fix the two components to one another in order to produce the actual load-bearing adhesive bond concurrently or later thereto. Particularly when the adhesives cure slowly, fixing of the components, which are to be connected, to one another is advantageous, because further handling of the component assembly is then already possible. The fixing adhesive bond is made in such a way that the drying process of the fixing adhesive has no influence on the position of the two components relative to one another.

For example, EP 1 690 906 B1 discloses a method for adhesively bonding two components together, according to which a fixing adhesive is first applied to the components, with which a fixing element is adhesively bonded in physical contact to each component, so that a fixing bonding point is produced for each fixing element towards each component. If the fixing adhesive has dried for a short time, the method suggests further applying adhesive, with which the subsequent actual adhesive bond is produced, over the entire surface of the fixing element and the fixing bonding points.

In order to achieve a shortest possible fixing of the two components, it is important that the fixing adhesive can cure quickly, for example, by means of UV irradiation, as is already known from the aforementioned method. However, it is often impossible to reach the fixing bonding points with UV radiation, so that an effective irradiation with UV light is basically not achieved, as a result of which the fixing adhesive does not cure as required.

SUMMARY OF THE INVENTION

It is therefore an object of the present invention to provide a method for adhesively bonding components, in particular a lamp holder on a mounting. In this case, at least one fixing bonding point should first be created in order to then produce a load-bearing adhesive bond. In so doing, it should be possible to create the fixing bonding point with the fixing adhesive in as short a time as possible.

The invention proposes in an exemplary embodiment that the method comprises at least the following steps: producing a load-bearing adhesive bond by means of introducing a slowly curing adhesive into or onto an adhesive receptacle between the components; arranging at least one light-transparent fixing element in physical contact with both components; adhesively bonding the fixing element to the components by means of introducing a fixing adhesive at fixing bonding points; transmitting light from a light source through the fixing element to cure the fixing adhesive at the fixing bonding points; and long-time curing of the slowly curing adhesive of the load-bearing adhesive bond.

In order to transmit light through the fixing element to cure the fixing adhesive at the fixing bonding points, the fixing element is made, for example, of a polycarbonate material or, for example, of glass, and the fixing element can be irradiated in a simple manner, in particular with a UV light source, and the UV light enters the body of the fixing element and reaches the fixing bonding points, which can also be in otherwise unreachable positions. In particular, the fixing bonding points can be covered by the fixing element itself, and components with very complex geometries can be bonded to one another using the method of the invention; in particular, fixing elements can be provided which have fixing bonding points arranged in positions that are not reachable or reachable with difficulty. The simple transparency of the fixing element or multiple fixing elements arranged on or between the components is sufficient to couple the light using a UV light source into the fixing element at only one point, and the UV light reaches the fixing bonding point due to the transmission of the fixing element and can cure the fixing adhesive. As a result, the UV curing of a fixing adhesive can also be used for the fixing adhesive bond between two complex components with fixing bonding points that are not reachable or reachable only with difficulty.

More than one fixing element can be arranged between the first and second component, in particular between the lamp holder and the mounting. In this case, two or in particular three fixing elements are preferably provided for arrangement between the two components, which results in a statically determined receiving of the lamp holder on the mounting. If the components are designed, for example, with a number of longitudinal edges, one or two fixing elements can be arranged on each of the longitudinal edges. In particular, when the first and/or second component has a cuboid or plate-shaped structure, as is the case in particular with lamp holders in arrangement on mountings for light modules, one or more load-bearing adhesive bonds can be formed between the components, and the fixing element(s) can be provided by means of a sphere or a spherical segment or by means of a cylinder or a cylindrical segment, wherein the arrangement of the fixing element in contact with both components can be produced using gravity. To improve the UV light coupling into the fixing element, the latter is preferably formed in the shape of a hemisphere or a half cylinder, so that the fixing element has a planar surface section into which light introduction without significant reflection losses is possible. In particular, the prior production of the load-bearing adhesive bond by introducing a slowly curing adhesive into or onto an adhesive receptacle can take place between the components in an otherwise unavailable way, and only then can the adjustment of the first component relative to the second component take place. The adjustment takes place in this case in a stage of the slowly curing adhesive in which the adhesive has not yet cured, and the fixing bonding points can then be produced. Long-time curing of the slowly curing adhesive of the load-bearing adhesive bond can only take place after the fixing bonding points have been produced. As a result, load-bearing adhesive bonds result which in particular lie between the two components in inaccessible areas, and only then are the fixing bonding points produced. The long-time curing of the slowly hardening and load-bearing adhesive bonds can then take place while maintaining the precise position of the two components in relation to one another by means of the fixing bonding points. The fixing bonding points can be designed so that further handling of the assembly of both components is possible, in particular, for example, to further process a light module consisting of a lamp holder as the first component and a mounting as the second component in the assembly.

The adhesive bond can be produced in this case with the two components in a position one above the other, in particular so that the components are arranged one above the other with respect to a direction of gravity, so that the slowly curing adhesive remains in the adhesive receptacle due to gravity. At the same time, the fixing element or elements in contact with both components can also be produced using gravity.

The surface of the lower component below the upper component can be made inclined at least in the contour area of the upper component, or it is provided that a wedge element is arranged on this surface, on which element the fixing element rolls until the contact of the fixing element with both components is made. The fixing element can, for example, be designed as a sphere or cylindrical body and can thereby roll, so that the fixing element rolls on the inclined contour area or on the wedge until the fixing element is in contact with the lower component and, in particular, also in contact with a surface or an edge of the upper component. The fixing bonding points can then be produced. The fixing adhesive can, for example, be applied beforehand to both components at the desired contact points.

The fixing element can be brought into contact with at least one of the components by means of a sliding element. The sliding element can preferably be moved in a controlled manner so that an especially precise positioning of the fixing element can be made.

In order to irradiate with the UV light, the light source can be brought with an emission surface adjacent to the fixing element or even placed on its surface. The placement of the light source in this case takes place such that it is ensured that the UV light also emerges again from the fixing element at the points where the fixing bonding points are located.

If, for example, two, three, or four fixing elements are provided in contact with both components, the fixing elements can lie, for example, on the surface of the lower component and lie against an edge of the upper component. Two surfaces can also be provided on which the fixing elements lie, wherein one surface of a first component and a further surface of a second component lie against the fixing element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a schematic view of two components that are adhesively bonded to one another using a second embodiment of the method of the invention; and FIG. 3 shows a simple illustration of a flowchart for the sequence of the method of the invention.

DETAILED DESCRIPTION

Figure 1:
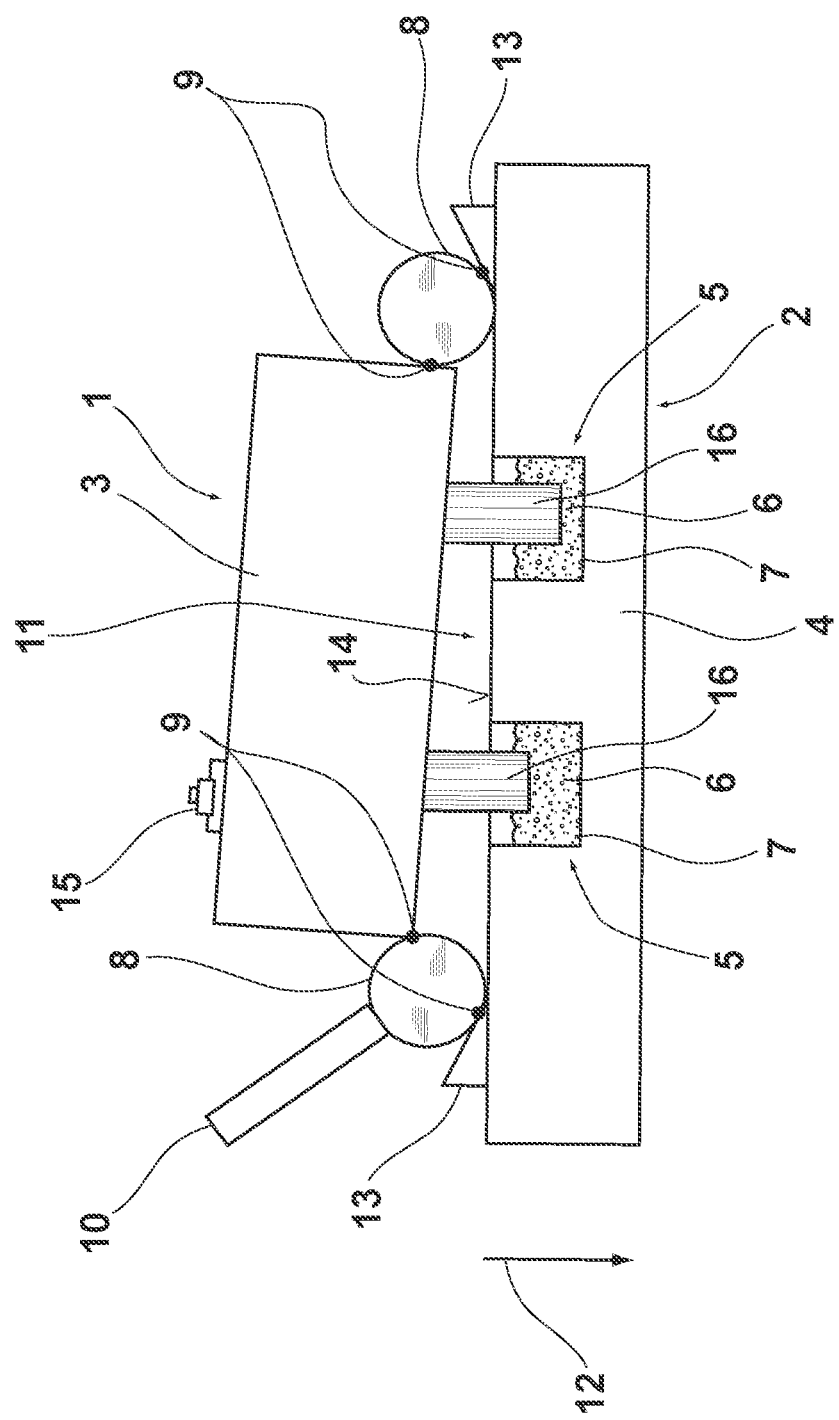
FIG. 1 shows a schematic view of two components that are adhesively bonded to one another using a first embodiment of the method of the invention.

FIG. 1 shows an arrangement of a first component 1 and a second component 2 lying thereunder, and first component 1 forms, for example, a lamp holder 3 and second component 2 forms, for example, a mounting 4. Such an arrangement can be found, for example, in the production of light modules with semiconductor illuminants 15 for headlights of vehicles, and illuminants 15 are placed on lamp holder 3. Mounting 4 can, for example, form a support body and also fulfill a cooling function.

The further arrangement of a light module with such components 1, 2 has, for example, a lens optic or a reflector, and illuminant 15 must be arranged positionally accurately relative to the reflector, for example. For this purpose, the arrangement shown is brought into an adjustment arrangement, and after illuminant 15 has been put into operation, the position, relative to mounting 4, of lamp holder 3 is changed with a manipulator until the desired lighting result is achieved. In this case, the reflector is located, for example, in a rigid arrangement with respect to mounting 4. Once the required position of lamp holder 3 has been reached, this position has to be frozen, so to speak, in order to achieve the desired lighting result permanently for the later operation of the light module.

For the long-term positionally accurate arrangement of first component 1 relative to second component 2, therefore, lamp holder 3 relative to mounting 4, a method for creating an adhesive bond between the two components 1, 2 is proposed that enables such a positionally accurate arrangement without a drying and thus curing adhesive again altering the precisely adjusted position of the two components 1, 2 in relation to one another due to a resulting shrinkage. To achieve this goal, the following method is proposed: producing a load-bearing adhesive bond by means of introducing a slowly curing adhesive into or onto an adhesive receptacle 7 between components 1 and 2; arranging at least one light-transparent fixing element 8 in physical contact with both components 1 and 2; adhesively bonding fixing element 8 to components 1 and 2 by means of introducing a fixing adhesive at fixing bonding points 9; transmitting light from a light source 10 through fixing element 8 to cure the fixing adhesive at fixing bonding points 9; and long-time curing of the slowly curing adhesive 6 of load-bearing adhesive bond 5.

For this purpose, load-bearing adhesive bond 5 is first produced without it already curing, so that a mobility of first component 1 relative to second component 2 is still maintained for some time even after load-bearing adhesive bond 5 has been produced by introducing adhesive 6, for example, into adhesive receptacle 7 designed as a cavity and inserting cylindrical pins 16 into adhesive 6. Adhesive receptacles 7 are formed, for example, by cavities which are introduced into surface 14 of lower-side component 2, which faces in the direction toward upper-side component 1. Cylindrical pins 16 protrude from the lower surface of upper component 1 and immerse into adhesive 6.

In order to bring fixing elements 8, for example, spheres or cylindrical pins, to the desired position so that the two fixing bonding points 9 can be achieved, wedge elements 13 are used, on which round fixing elements 8 roll until contact is created both between first component 1 and between second component 2.

If fixing elements 8 are in contact with both first component 1 and second component 2 in the arrangement shown, fixing bonding points 9 are irradiated with UV light, for which purpose a light source 10 is used. If light source 10 is activated, thus, UV light can enter the transparent fixing elements 8 and irradiate fixing bonding points 9. The illustration shows one light source 10 only by way of example, and the multiple fixing elements 8 can also be irradiated simultaneously by UV light, in particular with multiple light sources 10.

The position of fixing elements 8 can be produced by gravity, and the direction of gravity 12 shows that fixing elements 8 can roll on the upper, inclined plane of wedge elements 13 until contact to the edge or the side surface of first component 1 with fixing element 8 is produced. The contact points for forming fixing bonding points 9 can be wetted beforehand with fixing adhesive. Corresponding raised adhesive areas are formed by capillary action, which border the contact points with sufficient area coverage so that curing of fixing bonding points 9 can then take place with UV light. The fixing adhesive bond is sufficiently loadable to enable further handling of both components 1 and 2 in the assembly with one another.

The previous introduction of adhesive 6 into adhesive receptacles 7, for example, makes it possible to produce load-bearing adhesive bonds 5 even at inaccessible locations, and the adhesive fixing bonds with fixing elements 8 can only be produced afterwards. Adhesive 6 thereby cures over a long period such that the position of first component 1 relative to second component 2 can also still be adjusted without curing of adhesive 6 preventing a change in the position of the two components 1, 2 to one another.

FIG. 2 shows a schematic view of two components 1, 2 which are adhesively bonded to one another using a further embodiment of the method of the invention, wherein fixing elements 8 in the form of hemispheres or half cylinders are used here. These fixing elements 8 are attached both to supports 19 of component 1, which protrude into adhesive 6 and adhesive receptacle 7, and to the angular sliding elements 17. In this case, the attachment of fixing elements to supports 19 and sliding elements 17 is carried out in a preparatory work step, for instance, in the creation of a suitable adhesive bond. Sliding elements 17 are arranged on component 2 movable along the directions of movement 18, wherein sliding elements 17 are positioned relative to supports 19 such that contact between the respective fixing elements 8 can be produced or released by moving sliding elements 17 along the directions of movement 18. In the right-hand part of FIG. 2, a contact situation is shown between fixing elements 8 on support 19 and on the pushed-in sliding element 17. In the subsequent step of the method of the invention, this contact point would be adhesively bonded by introduction of the fixing adhesive. The left-hand part of FIG. 2 shows a spacing between fixing elements 8 on support 19 and sliding element 17, which corresponds in particular to the initial situation of the method step for arranging fixing elements 8. In order to optimize the accessibility of the contact point between fixing elements 8 for introducing the fixing support, the relative arrangement of fixing elements 8 on sliding elements 17 and legs 19 can be appropriately selected.

FIG. 3 shows a flowchart for the sequence of the method of the invention. The production 100 of a load-bearing adhesive bond occurs by means of introducing a slowly curing adhesive directly between the components to be bonded or into an adhesive receptacle between the components. In the special application of adhesively bonding a lamp body to a mounting, method step 100 is typically carried out in a manipulation unit after the component adjustment has been completed. In the second method step 110 of the method of the invention, at least one light-transparent fixing element is arranged in physical contact with at least one of the components. Next, the adhesive bonding 120 of the fixing element to at least one of the components is carried out by means of introducing a fixing adhesive at fixing bonding points. Thereafter, in order to cure the fixing adhesive at the fixing bonding points, irradiation 130 of the fixing element with a light source, in particular with UV light, is carried out. A sufficiently loadable bond between the two components has been created by means of these method steps in order to ensure a distortion-free long-time curing 140 of the slowly curing adhesive of the load-bearing adhesive bond.

The invention is not limited in its implementation to the preferred exemplary embodiment described above. Rather, a number of variants are conceivable which make use of the shown solution even in the case of fundamentally different embodiments. All features and/or advantages arising from the claims, the description, or the drawings, including structural details, spatial arrangements, and method steps, can be essential to the invention both individually and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for adhesively bonding a first component and a second component arranged positionally accurately in relation to one another, the method comprising:
    producing a load-bearing adhesive bond by introducing a slowly curing adhesive between the first and second components;
    arranging at least one light-transparent fixing element in physical contact with at least one of the first and second components;
    adhesively bonding the at least one light-transparent fixing element to the at least one of the first and second components by introducing a fixing adhesive at fixing bonding points;
    transmitting light from a light source through the at least one light-transparent fixing element to cure the fixing adhesive at the fixing bonding points; and
    long-time curing of the slowly curing adhesive of the load-bearing adhesive bond.

2. The method according to claim 1, wherein to cure the fixing adhesive at the fixing bonding points, the at least one light-transparent fixing element is irradiated with UV light by the light source.

3. The method according to claim 1, wherein the first component and/or the second component has a cuboid or plate-shaped structure, and wherein the load-bearing adhesive bond is formed in an intermediate region between the first and second components.

4. The method according to claim 1, wherein the at least one light-transparent fixing element is a sphere or a spherical segment or is a cylinder or a cylindrical segment, and wherein an arrangement of the at least one light-transparent fixing element in contact with both the first and second components is produced using gravity.

5. The method according to claim 1, wherein the slowly curing adhesive is introduced between the first and second components by being introduced into an adhesive receptacle recessed in the second component and wherein the first component is arranged above the second component with reference to a direction of gravity so that the slowly curing adhesive remains in the adhesive receptacle of the second component due to gravity.

6. The method according to claim 1, wherein the first component is an upper component and the second component is a lower component, wherein at least a portion of an upper surface of the lower component is made inclined or wherein a wedge element is arranged on the upper surface of the lower component, on which the at least one light-transparent fixing element rolls until contact of the at least one light-transparent fixing element with both of the first and second components is made.

7. The method according to claim 1, wherein the at least one light-transparent fixing element is brought into contact with at least one of the first and second components by a sliding element.

8. The method according to claim 1, wherein an emission surface of the light source is brought adjacent to the at least one light-transparent fixing element or placed directly on the at least one light-transparent fixing element.

9. The method according to claim 1, wherein the at least one light-transparent fixing element includes at least two or three or four fixing elements that are provided in contact with both of the first and second components, wherein the first component is an upper component and the second component is a lower component, and wherein the at least two or three or four fixing elements each lie on an upper surface of the lower component and each lie against a side edge of the upper component.

10. The method according to claim 1, wherein the first component is an upper component and the second component is a lower component, and wherein a first portion of the at least one light-transparent fixing element lies against an upper surface of the lower component and a second portion of the at least one light-transparent fixing element lies against a side surface of the upper component.

* * * * *